Feb. 10, 1942.　　　　　L. W. WOLFE　　　　　2,272,860
ANGLE METER FOR CUTTING PIPES
Filed April 25, 1940　　　　2 Sheets-Sheet 1
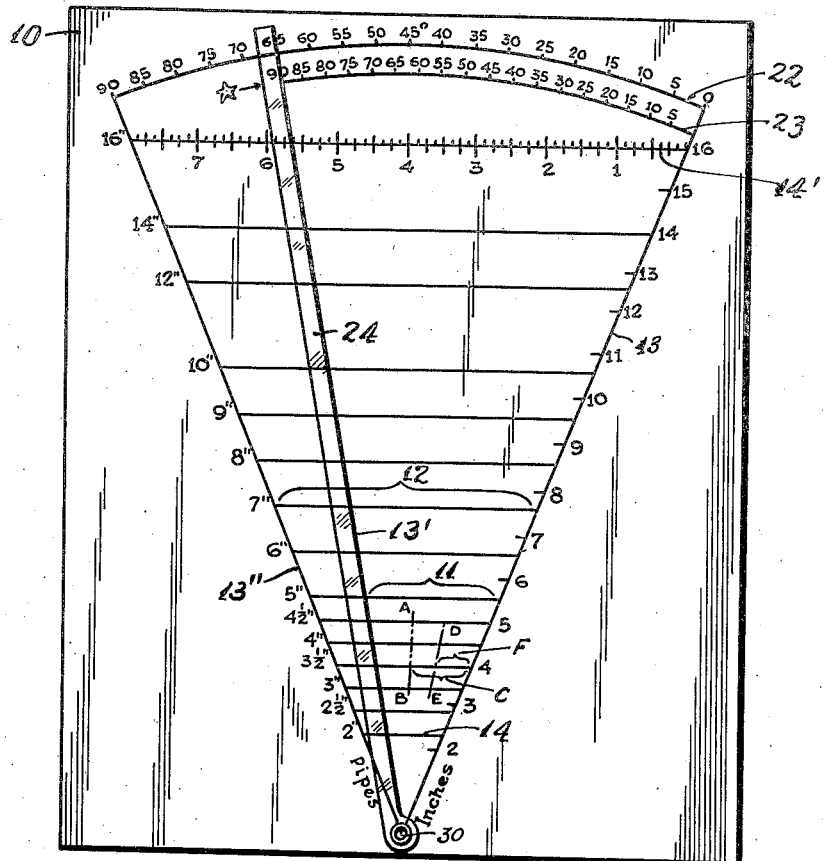
Fig. 1.
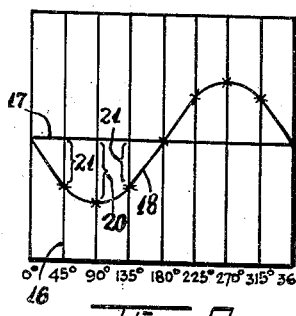
Fig. 2.
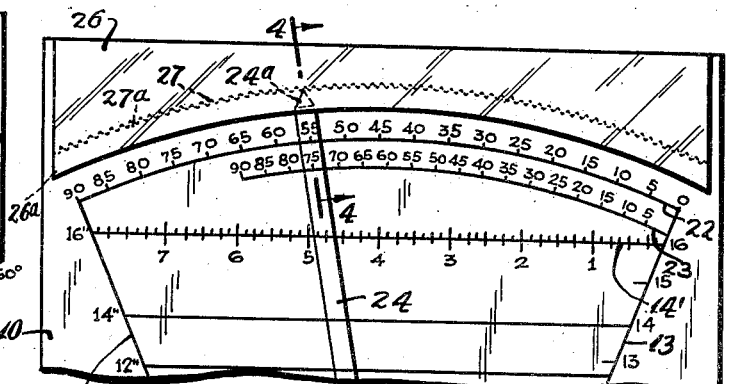
Fig. 3.
Fig. 4.
INVENTOR
Lem W. Wolfe
BY
ATTORNEY Feb. 10, 1942. L. W. WOLFE 2,272,860
ANGLE METER FOR CUTTING PIPES
Filed April 25, 1940 2 Sheets-Sheet 2

INVENTOR
Lem W. Wolfe
BY
ATTORNEY

Patented Feb. 10, 1942

2,272,860

UNITED STATES PATENT OFFICE 2,272,860

ANGLE METER FOR CUTTING PIPES

Lem W. Wolfe, Setauket, N. Y.

Application April 25, 1940, Serial No. 331,539

3 Claims. (Cl. 33—75)

This invention relates to new and useful improvements in meters, and has particular reference to an angle meter particularly adapted to guide the cutting of pipes at predetermined angles.

The invention proposes a meter adaptable for pipes of various sizes, for example, from pipe sizes of 2" to 16". However, this is only by way of illustration. It should be borne in mind that the angle meter may be designed to include or be applicable to other pipe sizes.

Still further the invention proposes to so construct the angle meter to guide the cutting of various sizes of pipes at various angles varying from 0° up to and including 90°. This range includes all possible angles since angles larger than 90° may be obtained by working on their complements.

More specifically, the invention proposes to characterize the angle meter by the fact that it merely gives certain distances for the various pipe sizes and for the various angles, and it is proposed to teach a method of using the angle meter by which these distances may be laid out upon the surface of a pipe in a particular manner to define the angle at which the pipe is to be cut.

More specifically, the invention contemplates constructing an angle meter which may be used substantially as follows: First a "small" circle is drawn around the pipe (by "small" we mean the circle in a plane which is at right angles to the axis of the pipe). It is then proposed that the circle be divided into a predetermined number of equal parts, and that longitudinal lines be drawn upon the surface of the pipe through these points. For example, eight equal parts would suffice, though this is not intended as a limitation since a meter could be constructed embodying this invention and making use of other sub-divisions. It is then proposed that the distances given by the angle meter be laid out on these longitudinal lines and that a smooth line curve be drawn through the extended ends of these lines to give the cut of the pipe.

It is further proposed to so arrange the angle meter and the method by which it is used, that the curve to guide the cutting of the pipe may be first inscribed on one quadrant or one section of the pipe, and then the curve may be repeated on the other three quadrants or sections to complete the curve formation. This simplifies matters as it is then only required to use the angle meter to produce one section of the curve, and by duplication the other sections may be acquired.

Still further the invention proposes to provide the angle meter with a straight edge mounted in a way so as to guide the division of the distances previously mentioned.

Another object of the invention resides in a novel arrangement by which the straight edge may be held in various positions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of an angle meter constructed in accordance with this invention.

Fig. 2 is a developed view of a length of pipe with a curve drawn thereon to guide a cut at a predetermined angle.

Fig. 3 is a fragmentary elevational view of an angle meter constructed in accordance with a modification of this invention.

Fig. 4 is a fragmentary sectional view taken on the line 4—4 of Fig. 3.

Figure 5:
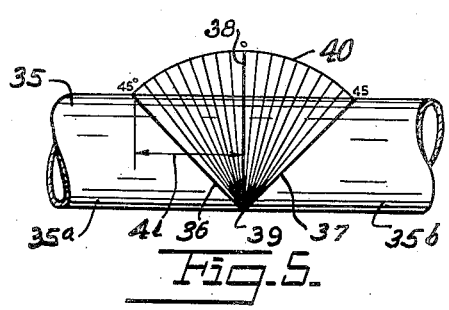
Fig. 5 is a side elevational view of a pipe and a schematic disclosure of angles thereon to which the pipe may be cut.

The angle meter, according to this invention, includes a flat body 10 having a pair of superimposed angles indicated by the brackets 11 and 12, respectively. These angles are of different degrees and are arranged on the face of the body 10 with one of their sides 13 common to each other. The other side of the angle 11 is indicated by reference character 13', and the other side of the angle 12 by reference character 13". These angles are of predetermined degrees which are either calculated or laid out so that the angle meter functions as hereinafter more fully described.

The angle side 13" is calibrated with pipe sizes in inches varying from 2" to 16", as shown on the drawing. The angle side 13 is calibrated in absolute inches of pipe sizes varying from 2" to 16" as shown on the drawing. Lines 14 are extended across the angles 11 and 12 at the points of the various pipe sizes. For example, the lowermost line 14 shows that a 2" pipe is slightly more than 2" diameter in actual measurement. The uppermost line 14' shows that a 16" pipe is actually 16" in measurement. This upper line 14' is calibrated in inches.

One method of obtaining the angles 11 and 12 is to lay out the lengths of the lines 14 starting from the angle side 13. Then the left hand extremities of the lines 14 are connected, producing the angle sides 13' and 13". The lengths of the lines 14 are obtained mathematically or mechanically. A mechanical method of obtaining these lengths will now be given. This method has particular reference to Figs. 2 and 5 to 8 inclusive.

Fig. 2 represents a developed view of a pipe, with the bottom line representing the angles from 0° to 360°. This distance is divided into eight equal parts and the vertical lines 16 are drawn at these points. Consequently, the spaces between these vertical lines represent angles of 45° each. A straight horizontal line 17 is drawn at any point upon the height of the figure and this line represents a "small" circle of the pipe. An actual curve 18 is drawn upon the figure representing a cut of the pipe of a predetermined angle. It should be noted that the curve is identical in each 90°. Consequently, an angle meter need merely give the curve for 90°, which may then be repeated for the other sections. Each 180° has three identifying lines, the long line 20 and the equal length short lines 21. Then the meter is constructed by using the long lines 20 for each of the pipe sizes for various angles and making the lines 14 represented by the angle 12 of the meter equal to these lines 20. The lines 21 are used to lay out the short lines 14 represented by the angle 11 of the meter. For the purpose of using appropriate language to define the invention the long lines 20, and therefore the lines 14 represented by the angle 12 of the meter, will hereafter be called the 90° longitudinal elements of 90° cuts of a cylinder. The short lines 21 and lines 14 represented by the angle 11 will hereafter be called the 45° longitudinal elements of the 90° cuts of a cylinder.

The meter is provided with a top scale 22 dividing the large angle 12 into degrees of pipe cuts varying from zero to 90°. The small angle 11 is provided with a similar scale 23. A straight edge 24 is pivotally mounted upon the apex of the angles 11 and 12 and is pivotally movable over the scales 22 and 23 so that the different angles may be projected on the different lines.

Figure 6:
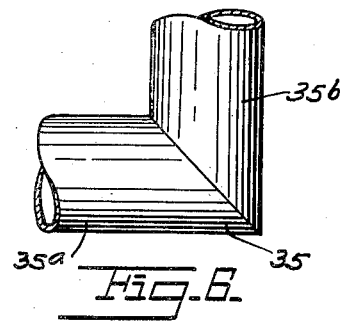
Fig. 6 is a side elevational view of the pipe shown in Fig. 5, but cut so that the sections thereof are at 90° from each other.

Attention is now called to Figs. 5 and 6. Fig. 5 illustrates a pipe 35 which may be cut into two sections 35a, 35b at predetermined angles to each other. The cuts indicated by the lines 36 and 37 are cuts which will set the end pieces 35a and 35b at 90° from each other. Fig. 6 shows the pipe sections in this latter condition. The small circle of the pipe 35 is indicated by the line 38. The pipe 35 may be cut to be set at different angles by cutting on various radiating lines from the point 39. A schematic arc 40 is illustrated joining the outer ends of the lines 36 and 37. This arc 40 may be calibrated in degrees. Now, then to understand the construction of the scales of the angle meter shown in Fig. 1 special consideration must be given to the distance indicated by the arrow 41, as this is one of the dominating distances on the scale.

Figure 7:
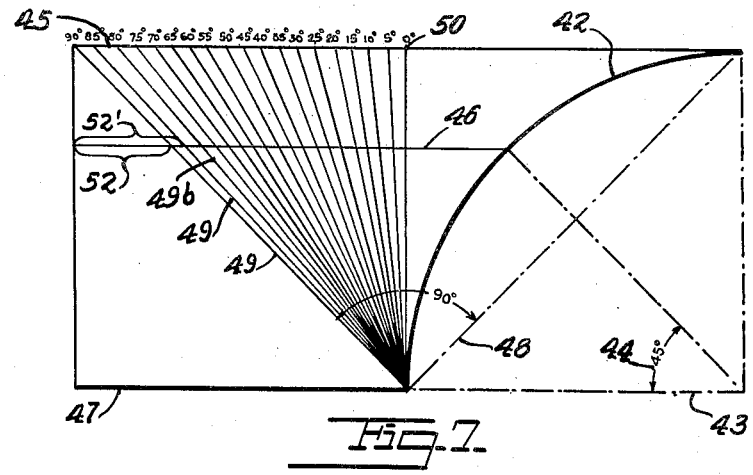
Fig. 7 is a schematic view of a calipering method for constructing certain parts of the angle meter shown in Fig. 1.
Figure 8:
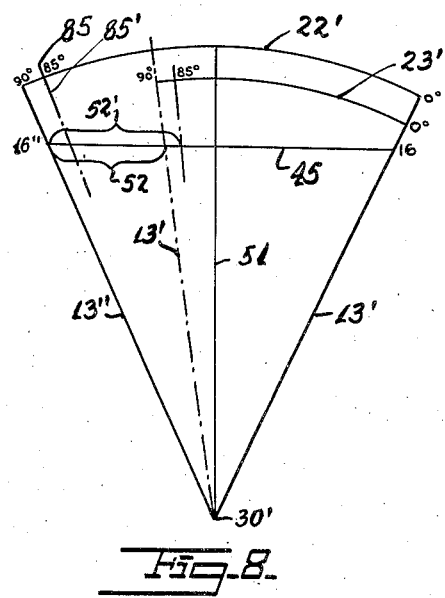
Fig. 8 is another schematic view on an enlarged scale to assist in understanding the construction of the scales of the angle meter.

Figs. 7 and 8 disclose a calipering system for constructing certain of the scales of the angle meter. First some specific size of pipe is selected, as for example, a sixteen inch pipe. Then an arc 42 is drawn having a radius 43 of eight inches, representing a sixteen inch pipe. This arc 42 is then divided by a 45° angle, indicated by reference numeral 44.

The parallel lines 45, 46, and 47 are drawn. The lines 48 and 49 are drawn. The angle between these lines 48 and 49, is 90°. Then an additional plurality of lines 49a, 49b, etc., are drawn to represent the various angles ranging from 90° to zero. However, these angles are figured only to the point 50 which in reality is the 45° point, but in accordance with the calipering, under consideration, must be zero since two sections of pipe cut at 45° and set together will be at 90°. The lines 49a, 49b, etc., are similarly labeled.

The line 45 from the point 50 to the point 90° is then laid off as shown in Fig. 8. It should be understood that Fig. 8 is drawn on a slightly larger scale than Fig. 7 and for this reason the line 45 is slightly larger. A vertical line 51 is drawn at right angles through the center of the line 45. The line 46 represents the 45° longitudinal elements of a 90° cut previously explained, and a length thereof may be laid out on Fig. 8 by calipering the distance divided off by the bracket 52 and laying off this distance on the line 45 starting from the left hand end.

The arcs 22' and 23' are struck from any arbitrary but convenient point 30' as a radius. The lines 13" and 13 are drawn from the point 30' upwards past the ends of the line 45. The line 13' is drawn from the point 30' past the right hand end of the line portion 52. The arcs 22' and 23' are divided into angles varying from zero to 90°, as calipered indirectly from Fig. 7. For example, to obtain the 85° marking for the arc 22' the distance from the point 50 to 85° in Fig. 7 is laid out on the line 45 and then this point is projected upwards on the arc 22' by a line 85' radiating from the point 30'. Similarly, the 85° point on the arc 23' is obtained by calipering the distance 52' from Fig. 7 and laying it out on the line 45 and projecting it upwards radially upon the arc 23'. In this way the two arcs 22' and 23' are calibrated.

To obtain the other lines corresponding with the line 45 but for different size pipe, a similar procedure is followed. A diagram similar to Fig. 7 is laid out for each pipe size. However, now it is merely necessary to obtain the length of the line 45 for each particular pipe size. Then this line is calipered and fitted horizontally in between the lines 13' and 13". In this way the various lines 14 referred to in Fig. 1 are laid out for the various pipe sizes desired.

In Figs. 3 and 4 a modified form of the invention has been disclosed in which a means is provided for holding the straight edge 24 in various angularly fixed positions. This means comprises a body 26 mounted on the flat body 10 and having a bottom arcuate side 27 formed with a plurality of vertical serrations 27a. The upper end of the straight edge 24 is provided with an enlarged head portion 24a of a pointed shape adapted to engage in any one of the group of serrations 27a.

The body 26 at its bottom end is provided with an inwardly directed flange 26ª which extends beneath the head 24ª. The rigidity of the straight edge 24 is depended upon to maintain the engagement of the head 24ª with a serration 27ª. The straight edge 24 consequently is locked in position. However, the straight edge 24 may be moved by first flexing an intermediate area upwards so that the head 24ª is pulled out from the serration 27ª. Now the bottom of the head 24ª engages the flange 26ª. The straight edge 24 may now be pivoted in one direction or the other. A pintle rivet 30 which engages through the bottom of the straight edge 24 and the material of the body 10 serves to pivotally support the straight edge.

The operation of the angle meter is as follows:

By way of illustration, assume that it is required to cut a 3½" pipe so that the cut pieces when placed together are at a 45° angle. A "small" circle is first drawn on the 3½" pipe. Then the longitudinal lines dividing the 3½" pipe into eight equal spaces are drawn upon the outside of the pipe. These lines are consequently 45° apart. The straight edge 24 is now pivoted to indicate 45° on the large scale 22. The edge of the straight edge 24 will then be along the line AB. The distance C is then laid off on one of the longitudinal lines. Then the straight edge 24 is moved to 45° on the small scale 23 and it will then extend along the line DE. The distance F is then laid off on the two lines to the sides of the line upon which the distance C was just laid off. The curve may then be drawn through 180° of the pipe. A similar curve is drawn for the remaining 180°. The pipe may now be cut on this curve and it will be truly cut at an angle so that when the parts are placed together they will be at a 45° angle.

From the above explanation it is believed that the cutting of pipes of various sizes and at various degrees is obvious.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described having an arcuate scale and a flexible straight edge member having one end pivotally mounted so that its free end may be moved across said arcuate scale concentric therewith, an arcuate body positioned adjacent the free end of said straight edge member concentric with said arcuate scale, serrations formed on the inner edge of said arcuate body adjacent said straight edge member, and a pointed head formed on the free end of said straight edge member and normally engaging one of said serrations for holding said straight edge member against pivoting, whereby said straight edge member may be flexed to withdraw its pointed end from its engaged position with said serrations to free said straight edge member to be moved across said arcuate scale.

2. In a device of the class described having an arcuate scale and a flexible straight edge member having one end pivotally mounted so that its free end may be moved across said arcuate scale concentric therewith, an arcuate body positioned adjacent the free end of said straight edge member concentric with said arcuate scale, serrations formed on the inner edge of said arcuate body adjacent said straight edge member, and a pointed head formed on the free end of said straight edge member and normally engaging one of said serrations for holding said straight edge member against pivoting, whereby said straight edge member may be flexed to withdraw its pointed end from its engaged position with said serrations to free said straight edge member to be moved across said arcuate scale, said arcuate body being formed with a projecting portion overhanging the free end of said straight edge member, and means for preventing the free end of said straight edge member from being disengaged from beneath said projecting portion.

3. In a device of the class described having an arcuate scale and a flexible straight edge member having one end pivotally mounted so that its free end may be moved across said arcuate scale concentric therewith, an arcuate body positioned adjacent the free end of said straight edge member concentric with said arcuate scale, serrations formed on the inner edge of said arcuate body adjacent said straight edge member, and a pointed head formed on the free end of said straight edge member and normally engaging one of said serrations for holding said straight edge member may be flexed to withdraw its pointed end from its engaged position with said serrations to free said straight edge member to be moved across said arcuate scale, said arcuate body being formed with a projecting portion overhanging the free end of said straight edge member, and means for preventing the free end of said straight edge member from being disengaged from beneath said projecting portion, comprising a flange formed on the free edge of said projecting portion and directed downwards towards the face of said straight edge member to be engaged by said enlarged head.

LEM W. WOLFE.